(12) United States Patent
Kikuchi et al.

(10) Patent No.: US 7,087,201 B2
(45) Date of Patent: Aug. 8, 2006

(54) PROCESS FOR PRODUCING GOLF BALL

(75) Inventors: Masaaki Kikuchi, Kobe (JP); Tsutomu Hirau, Kobe (JP); Keiji Moriyama, Kobe (JP)

(73) Assignee: SRI Sports Limited, Kobe (JP)

( * ) Notice: Subject to any disclaimer, the term of this patent is extended or adjusted under 35 U.S.C. 154(b) by 234 days.

(21) Appl. No.: 10/712,046

(22) Filed: Nov. 14, 2003

(65) Prior Publication Data

US 2004/0173939 A1    Sep. 9, 2004

(30) Foreign Application Priority Data

Dec. 17, 2002    (JP) .............................. 2002-365382

(51) Int. Cl.
*B29C 65/00*    (2006.01)
*B29C 43/18*    (2006.01)

(52) U.S. Cl. .................. 264/248; 264/250; 264/279.1; 264/320

(58) Field of Classification Search ................ 264/248, 264/320, 250, 279.1
See application file for complete search history.

(56) References Cited

U.S. PATENT DOCUMENTS 5,798,071 A      8/1998   Boehm
6,468,381 B1 *  10/2002   Morgan ................. 156/244.19

* cited by examiner

*Primary Examiner*—Edmund H. Lee
(74) *Attorney, Agent, or Firm*—Birch, Stewart, Kolasch & Birch, LLP

(57) ABSTRACT

Half shell 10 has a bowl-like shape, and is composed of a thermoplastic resin composition. The half shell 10 has a top part 11 and a side part 12. The thickness Tt of the top part 11 is less than the thickness Ts of the side part 12. The difference (Ts−Tt) between both thicknesses is 0.02 mm or greater and 0.30 mm or less. Two half shells 10 and a core covered by the half shells 10 are placed into a mold comprising an upper portion and a lower portion both of which having a semi hemispherical cavity. Upon clamping, the thermoplastic resin composition is compressed while being heated, resulting in outflow of the excess thermoplastic resin composition from the cavity. A cover is formed having the nominal thickness of 0.3 mm or greater and 1.0 mm or less with remained thermoplastic resin composition.

4 Claims, 6 Drawing Sheets

PROCESS FOR PRODUCING GOLF BALL

This Nonprovisional application claims priority under 35 U.S.C. § 119(a) on Patent Application No(s). 2002-365382 filed in JAPAN on Dec. 17, 2002, the entire contents of which are hereby incorporated by reference.

BACKGROUND OF THE INVENTION

1. Field of the Invention

The present invention relates to processes for producing a golf ball. More particularly, the present invention relates to improvement of compression molding processes of a cover.

2. Description of the Related Art

General golf balls other than those for use in practice ranges have a core and a cover. The cover is composed of a thermoplastic resin composition. For forming a cover, an injection molding process or a compression molding process is employed.

The injection molding process is excellent in mass production capability. According to the injection molding process, the core is first retained at a center of a spherical cavity by holding pins. Next, a molten thermoplastic resin composition is injected into a gap between the cavity face and the core. Because the holding pins shift backward in a final stage of the injection, the core may deviate from the center, concurrent with the flow of the resin composition. The deviation causes unevenness in the thickness of the cover (generally referred to as "uneven wall thickness"). The air which is present in the gap between the cavity face and the core is discharged from a bent hole or a clearance of the holding pin in accordance with the influx of the resin composition. When this discharge is insufficient, defective appearance due to the residual air occurs. Accordingly, difficulties are involved in the production of a high quality golf ball by the injection molding process.

In a compression molding process, two half shells composed of a thermoplastic resin composition, and a core covered by these half shells are placed into a mold. This mold comprises an upper portion and a lower portion. By clamping this mold, the resin composition is compressed, and the excess resin composition outflows from the parting line. The air which is present between the core and the half shell is discharged from the parting line concomitant with the outflow of the resin composition.

When the resin composition outflows toward a specific direction in a converged manner in the compression molding process, uneven wall thickness is caused. In particular, when the amount of outflow is abundant, uneven outflow is liable to take place. Furthermore, the resin composition in the vicinity of the parting line is liable to outflow, whilst the resin composition which is positioned far from the parting line hardly outflows, therefore, sphericity of the golf ball may become thereby insufficient. Uneven thickness and low sphericity exert a detrimental effect on performances of the golf ball. Particularly, performances of a golf ball having a small nominal thickness of the cover are greatly influenced by the detrimental effect of the uneven thickness and low sphericity.

In Japanese Patent No. 3130946, a process for producing a golf ball in which an injection molding process and a compression molding process are combined. According to this process for the production, a preformed piece is first obtained by injecting a resin composition around a core. This preformed piece is placed into a mold, and a cover is formed by a compression molding process. This process for the production requires two steps for forming the cover.

An object of the present invention is to provide a process for the production in which a golf ball having excellent sphericity is obtained with suppressed uneven wall thickness.

SUMMARY OF THE INVENTION

A process for producing a golf ball according to the present invention comprises the following steps:

(1) a first step wherein a half shell is formed comprising a thermoplastic resin composition, having a bowl-like shape, and having the thickness of the top part less than the thickness of the side part;

(2) a second step wherein two pieces of this half shell and a core covered by these half shells are placed into a mold comprising an upper portion and a lower portion both of which having a semi hemispherical cavity, in a state of this mold opened;

(3) a third step wherein this mold is clamped; and (4) a fourth step wherein a thermoplastic resin composition is compressed while being heated in the spherical cavity formed by the clamping, resulting in outflow of the excess thermoplastic resin composition from the spherical cavity, to form a cover having the nominal thickness of 0.3 mm or greater and 1.0 mm or less with remained thermoplastic resin composition.

According to this process for the production, a cover having small nominal thickness, specifically, a cover having the thickness of 0.3 mm or greater and 1.0 mm or less can be obtained without uneven wall thickness by an ingeniously contrived shape of the half shell. The golf ball obtained in this process for the production is excellent in sphericity. In light of the suppression of uneven wall thickness and in light of sphericity, the difference (Ts−Tt) between the thickness Ts of the side part and the thickness Tt of the top part of the half shell formed in the first step is preferably 0.02 mm or greater and 0.30 mm or less.

Preferably, the volume of the thermoplastic resin composition of the two half shells is set to be 105% or greater and 120% or less of the volume of the cover. This half shell is responsible for the improvement of the sphericity and decrease in the ratio of defective appearance of the golf ball.

Preferably, the fourth step includes a low pressurizing step and a subsequent high pressurizing step. In the low pressurizing step, the thermoplastic resin composition is compressed at a pressure of 5 kgf/cm$^2$ or greater and 75 kgf/cm$^2$ or less. In the high pressurizing step, the thermoplastic resin composition is compressed at a pressure of 100 kgf/cm$^2$ or greater and 250 kgf/cm$^2$ or less. By providing the low pressurizing step and high pressurizing step, the ratio of defective of the golf ball is reduced.

DESCRIPTION OF THE PREFERRED EMBODIMENTS

The present invention is hereinafter described in detail with appropriate references to the accompanying drawing, according to the preferred embodiments of the present invention.

Figure 1:
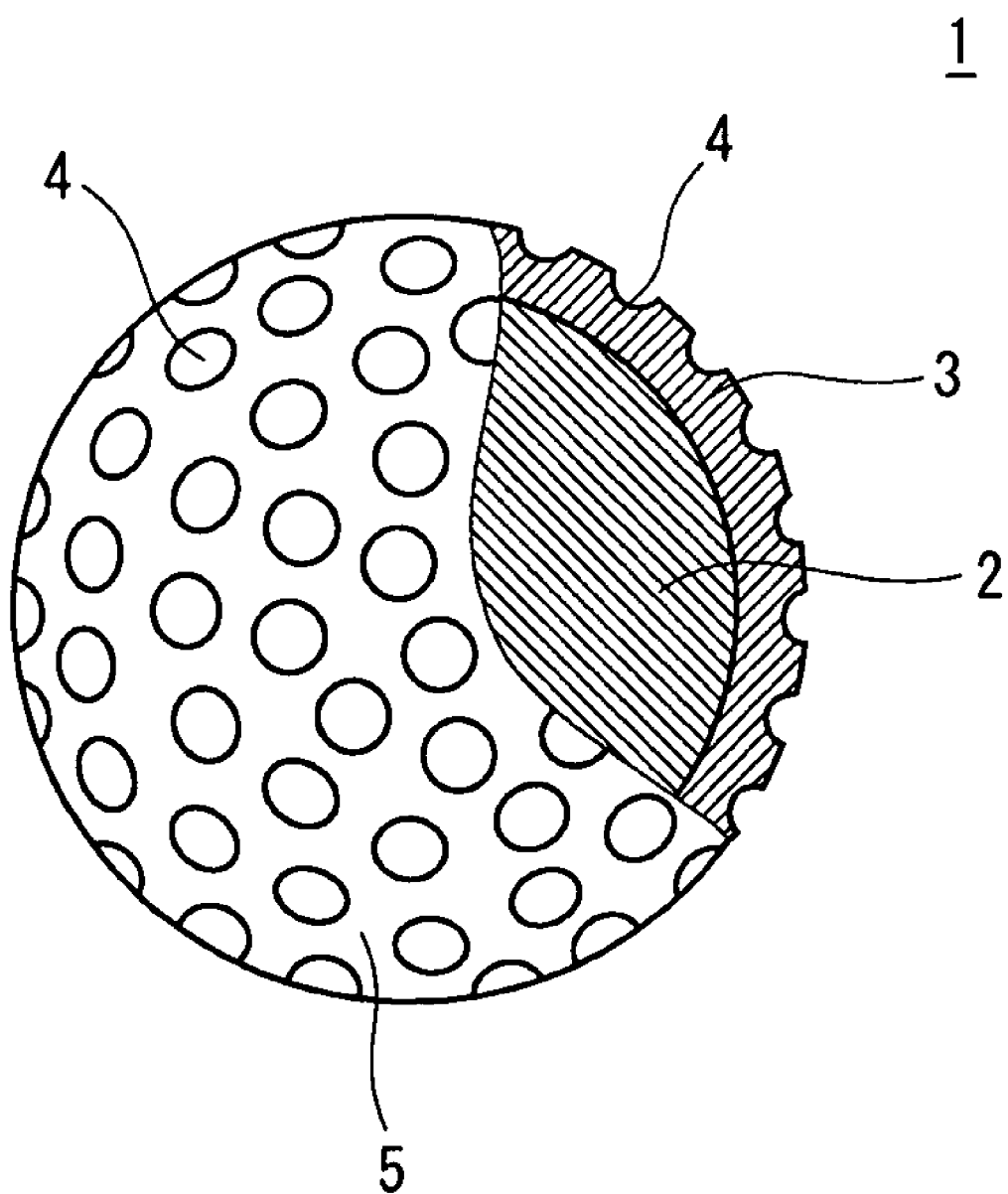
FIG. 1 is a partially cut off cross sectional view illustrating a golf ball obtained by a process for the production according to one embodiment of the present invention.

A golf ball 1 depicted in FIG. 1 has a core 2 and a cover 3 which is positioned outside of this core 2. The core 2 is formed by crosslinking of a rubber composition. The core 2 may be composed of two or more layers. The core may be composed of a spherical center, and a mid layer comprising a thermoplastic resin composition. Numerous dimples 4 are formed on the surface of the cover 3. Of the surface of the cover 3, a part other than the dimples 4 is a land 5. This golf ball 1 has a paint layer and a mark layer on the outside of the cover 3, although not shown in the Figure.

This golf ball 1 has a diameter of from 40 mm to 45 mm, and in particular, of from 42 mm to 44 mm. In light of the reduction of air resistance in the range to comply with a rule defined by United States Golf Association (USGA), the diameter is particularly preferably 42.67 mm or greater and 42.80 mm or less. Weight of this golf ball 1 is generally 40 g or greater and 50 g or less, and particularly 44 g or greater and 47 g or less. In light of the elevation of inertia in the range to comply with a rule defined by USGA, the weight is particularly preferably 45.00 g or greater and 45.93 g or less.

Nominal thickness of the cover 3 of this golf ball 1 is 0.3 mm or greater and 1.00 mm or less. This nominal thickness is less than the nominal thickness of the cover of general golf balls which are available in the market. Such a thin cover 3 imparts a performance, which is not found in conventional golf balls, to the golf ball 1. The nominal thickness is calculated by: envisioning a regular octahedron inscribing the phantom sphere of the golf ball; determining the lands 5 that are closest to each of the six apexes of this regular octahedron; and averaging the thicknesses of the cover 3 measured just beneath these six lands 5.

Figure 2:
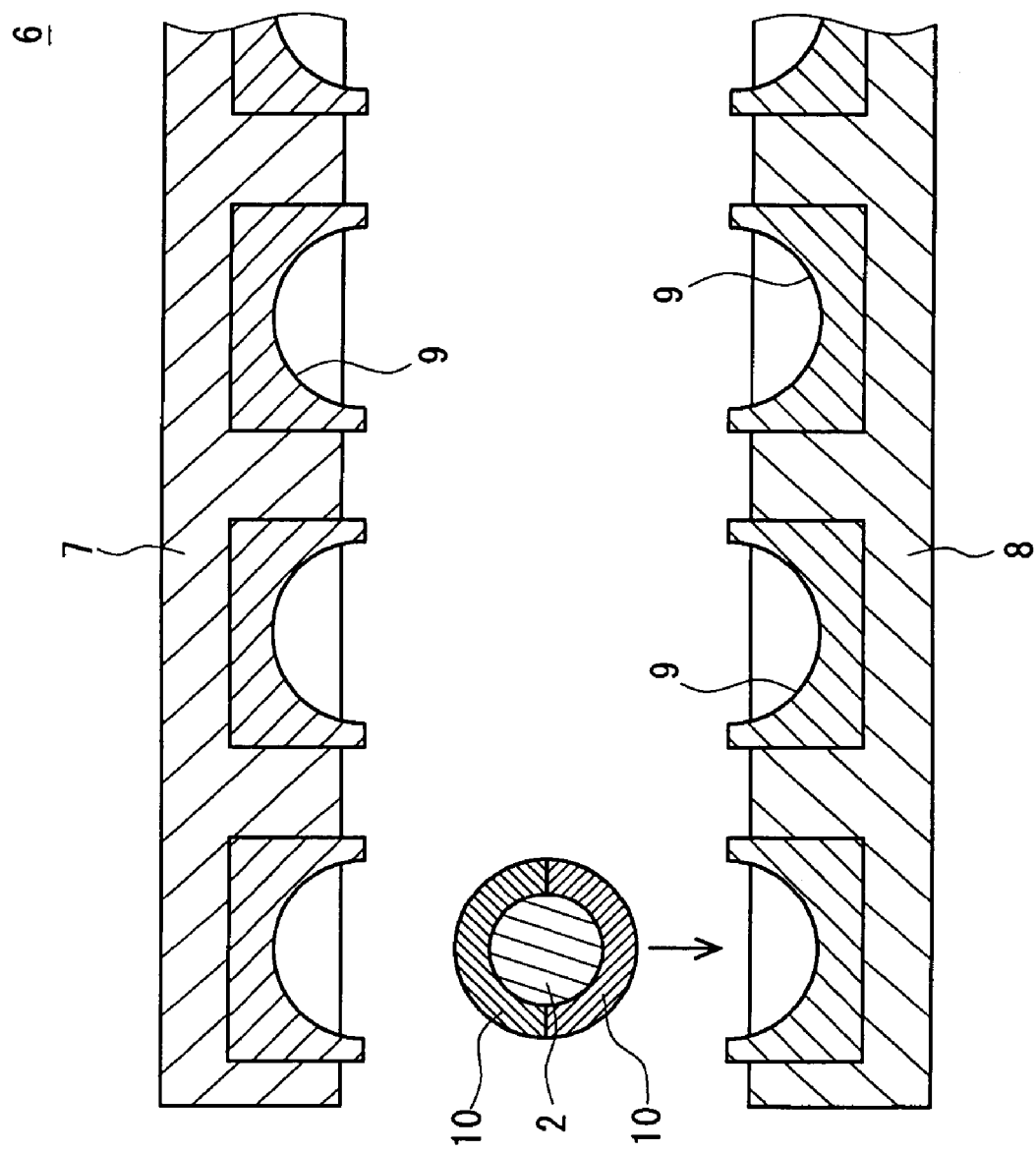
FIG. 2 is a cross sectional view illustrating a part of a mold for use in the production of the golf ball shown in FIG. 1.

FIG. 2 is a cross sectional view illustrating a part of a mold 6 for use in the production of the golf ball 1 shown in FIG. 1. The mold 6 comprises an upper portion 7 and a lower portion 8. Each of the upper portion 7 and the lower portion 8 has a number of cavity faces 9. Semispherical cavities are formed by these cavity faces 9. When the upper portion 7 and the lower portion 8 are brought into contact, spherical cavities are formed. Although not shown in the Figure, a number of protrusions are formed on the cavity face 9. As described herein below, dimples 4 are formed by these protrusions.

Figure 3:
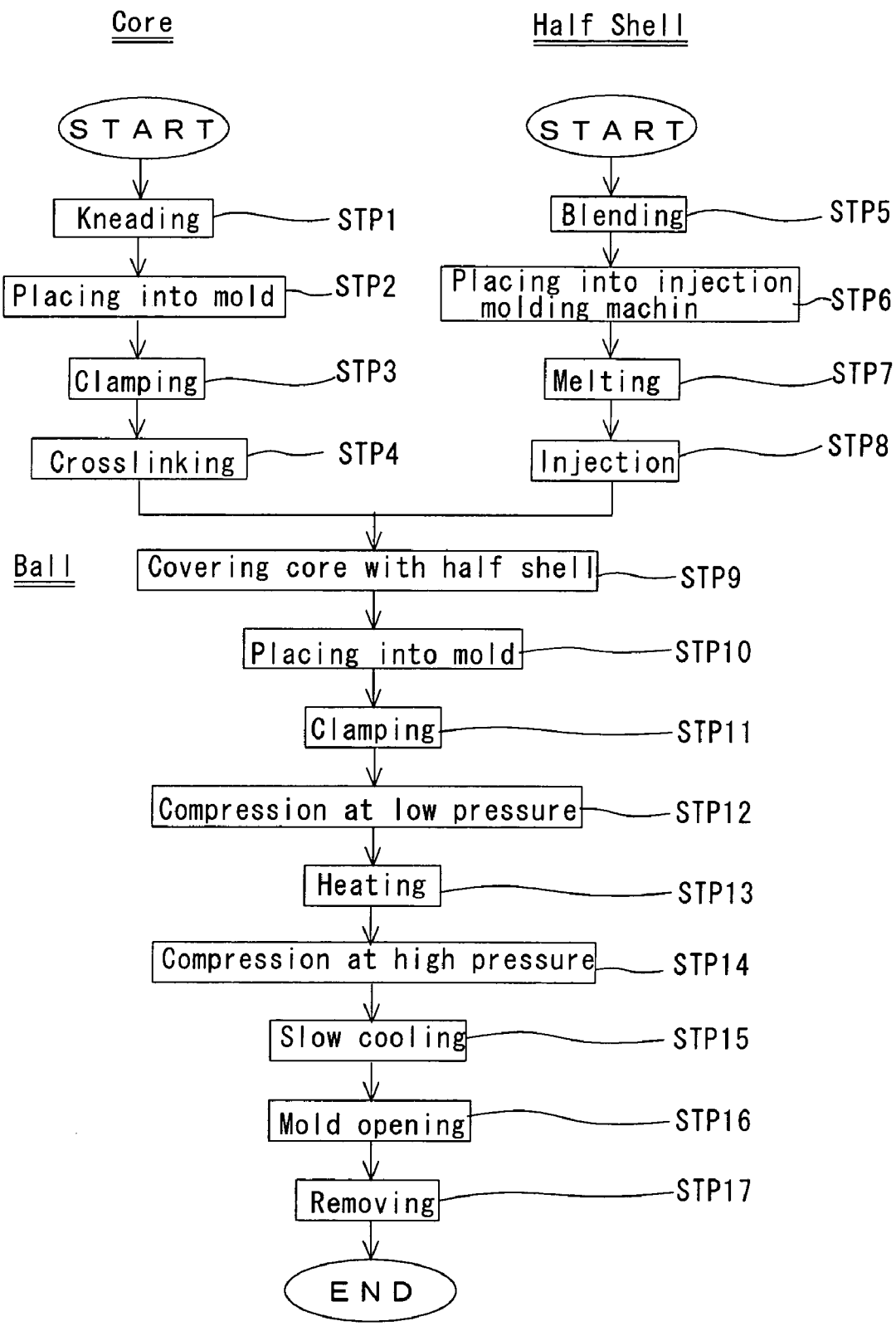
FIG. 3 is a flowchart illustrating one example of the process for producing the golf ball shown in FIG. 1.

FIG. 3 is a flowchart illustrating one example of a process for producing the golf ball 1 shown in FIG. 1. In this process for the production, a base rubber, a crosslinking agent and various types of additives are first kneaded to give a rubber composition (STP 1). Next, this rubber composition is placed into a mold comprising an upper portion and a lower portion and having spherical cavities (not shown in the Figure) (STP 2). Then, this mold is clamped (STP 3). Next, the rubber composition is heated via the mold. Crosslinking reaction of the rubber is caused by the heating (STP 4). Through the crosslinking, the rubber composition is cured to give a spherical solid core 2.

On the other hand, a thermoplastic resin and various types of additives are blended to give a resin composition (STP 5).

Next, this resin composition is placed into an injection molding machine (STP 6). The resin composition is heated in the cylinder of the injection molding machine, and is molten (STP 7). Next, this molten resin composition is injected into a mold (not shown in the Figure) (STP 8). This mold comprises an upper portion having a convex part and a lower portion having a concave part. The resin composition is filled into a gap between the convex part and the concave part. A half shell 10 (see, FIG. 2) is thus obtained. The half shell has a bowl-like shape.

Next, the core 2 is covered by two half shells 10 (STP 9). Then, the half shells 10 and the core 2 are placed into the mold 6 as depicted by the arrow in FIG. 2 (STP 10). The half shells 10 and the core 2 are generally disposed on the cavity face 9 of the lower portion 8.

Next, the lower portion 8 is gradually elevated to clamp the mold 6 (STP 11). The clamping is usually executed by a pressing machine. The half shells 10 (i.e., a thermoplastic resin composition) are compressed through the clamping (STP 12). The pressure of the compression is relatively low. Concurrently with the clamping, the temperature of the mold 6 is gradually elevated, and thus the resin composition is heated via the mold 6 (STP 13). The resin composition is molten by heating, and then flows. Excess resin composition outflows from the spherical cavity upon the compression. The outflow is executed through a fine gap between the upper portion 7 and the lower portion 8 (parting line). At the same time, the air that is present between the half shells 10 and the cavity face 9, and the air that is present between the half shells 10 and the core 2 are discharged from the spherical cavity.

Next, the pressure for clamping is increased to compress the resin composition at a high pressure (STP 14). The upper portion 7 and the lower portion 8 are almost completely contacted with each other by the compression at a high pressure. Thereafter, outflow of the resin composition hardly occurs. By the compression at a high pressure (STP 14), the remained resin composition presents a shape taken along the cavity face 9. In other words, dimples 4 are formed having a shape which is reverse to the shape of the protrusion.

While keeping the high clamping pressure, the temperature of the mold 6 is slowly cooled (STP 15). At the stage where the temperature is sufficiently lowered, the mold is opened (STP 16), and the golf ball 1 is removed (STP 17). The resin composition covers over the core 2 to form a cover 3.

The pressure in the low pressurizing step (STP 12) is preferably 5 kgf/cm$^2$ or greater and 75 kgf/cm$^2$ or less. When the pressure is less than the above range, the air between the half shells 10 and the core 2 may not be sufficiently discharged. In this respect, the pressure is more preferably equal to or greater than 10 kgf/cm$^2$, and particularly preferably equal to or greater than 20 kgf/cm$^2$. When the pressure is beyond the above range, uneven wall thickness may be caused through outflow of the resin composition toward a specific direction in a converged manner. In this respect, the pressure is more preferably equal to or less than 60 kgf/cm$^2$, still more preferably equal to or less than 50 kgf/cm$^2$, and particularly preferably equal to or less than 45 kgf/cm$^2$.

The pressure in the high pressurizing step (STP 14) is preferably equal to or greater than 100 kgf/cm$^2$. When the pressure is less than the above range, the resin composition excessively outflows from the spherical cavity, and bare may be generated. In this respect, the pressure is more preferably equal to or greater than 105 kgf/cm$^2$. A large scale pressing machine is required for achieving extremely high pressure, and the excessive pressure may lead to damages on the mold 6. Therefore, the pressure is usually set to be equal to or less than 250 kgf/cm², and particularly equal to or less than 180 kgf/cm².

Figure 4:
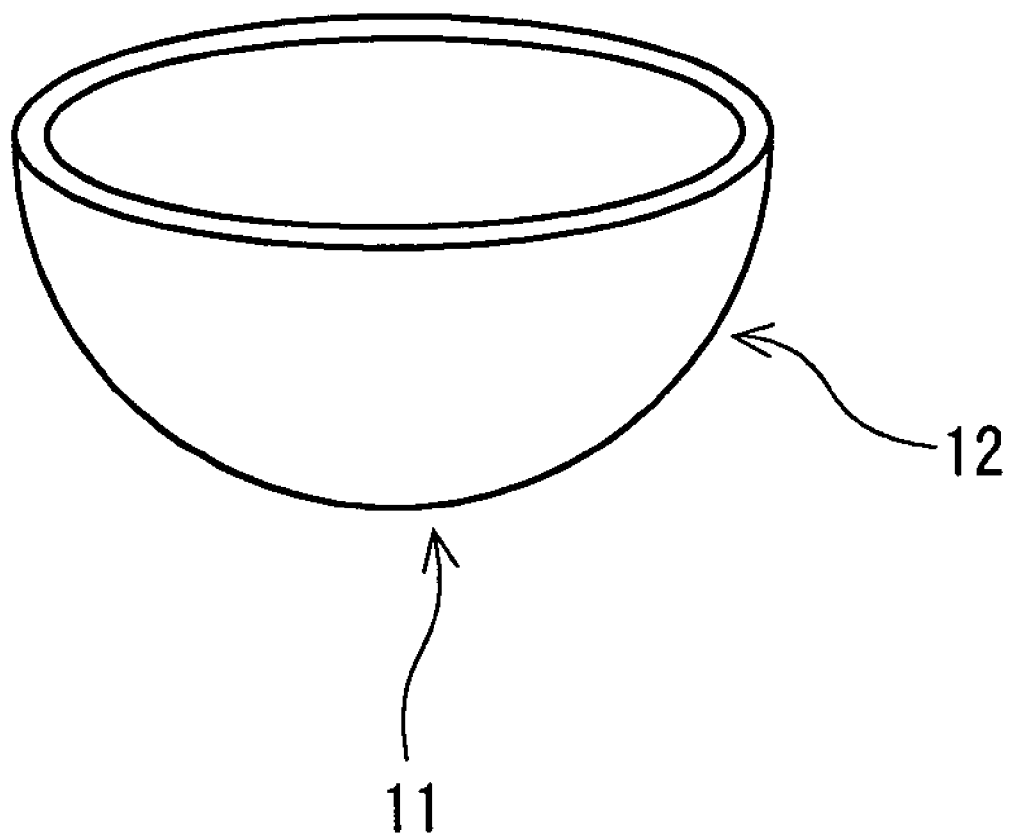
FIG. 4 is a perspective view illustrating a half shell for use in the process for the production according to the present invention.
Figure 5:
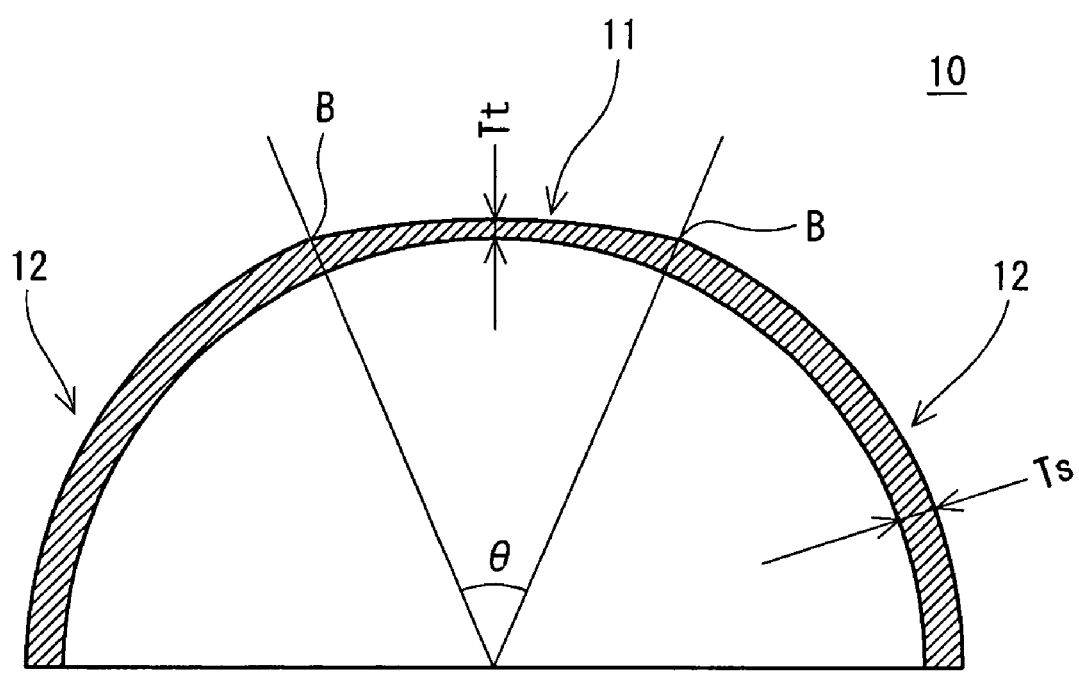
FIG. 5 is an enlarged cross sectional view illustrating the half shell shown in FIG. 4.

FIG. 4 is a perspective view illustrating a half shell 10 for use in the process for the production according to the present invention, and FIG. 5 is an enlarged cross sectional view of the same. FIG. 5 illustrates a vertically inverted state of the half shell 10 shown in FIG. 4. As is shown in FIG. 5, this half shell 10 has a top part/central part 11 and side parts 12. What is indicated by the symbol B in FIG. 5 is a boundary between the top part 11 and the side parts 12. As is clear from FIG. 5, the top part 11 is the thinnest at the central point, and becomes gradually thicker from the central point toward the boundaries B. What is indicated by two arrowheads, Tt, in FIG. 5 is the thickness of the top part 11. The thinnest site in the top part 11 is determined, and the thickness Tt is measured at this site. The top part 11 may have an even thickness. The side part 12 has an even thickness. What is depicted by two arrowheads Ts in FIG. 5 is the thickness of the side part 12. The thickness of the side part 12 may be uneven, and in this instance, the thickest site is determined in the side part 12, and the thickness Ts is measured at this site. Such a half shell 10 can be obtained by an ingeniously contrived shape and size of the mold for use in the injection step (STP 8).

When the cover 3 having a small nominal thickness is formed, the gap between the core 2 and the cavity face 9 should be narrow. In light of preventing the resin composition from outflowing toward a specific direction in a converged manner, total amount of the outflow must be suppressed. In a compression molding process in which a narrow gap is used and the total amount of the outflow is suppressed, flow of the resin composition which is positioned in the vicinity of a pole of the cavity tends to be insufficient. When the flow is insufficient, the thickness of the cover in the vicinity of the pole becomes large, and thus it is inevitable that a golf ball 1 having an oval shape is formed. In the process for the production according to the present invention, such a problem is solved by using half shells having the thickness of the top part 11 less than the thickness of the side part 12. According to the process for the production, a golf ball 1 which is excellent in sphericity and uniformity of the thickness of the cover thereof is obtained.

In light of the suppression of the increased thickness of the cover in the vicinity of the pole, and of the formation of the golf ball 1 having an oval shape, the difference (Ts−Tt) between the thickness Ts of the side part 12 and the thickness Tt of the top part 11 is preferably equal to or greater than 0.02 mm, more preferably equal to or greater than 0.05 mm, still more preferably equal to or greater than 0.07 mm, and particularly preferably equal to or greater than 0.10 mm. When the difference (Ts−Tt) is enormously great, bare is liable to occur in the vicinity of the pole. Therefore, the difference (Ts−Tt) is preferably equal to or less than 0.30 mm, and particularly preferably equal to or less than 0.25 mm. The difference (Tt−T) between the thickness Tt of the top part 11 and the nominal thickness T is usually −0.2 mm or greater and 0.2 mm or less. The difference (Ts−T) between the thickness Ts of the side part 12 and the nominal thickness T is usually 0.05 mm or greater and 0.40 mm or less.

Central angle θ of the top part 11 is preferably 10° (degree) or greater and 70° or less, and particularly preferably 15° or greater and 55° or less. When the boundary B between the top part 11 and the side part 12 is indefinite, the boundary B is determined such that the central angle θ of the top part 11 becomes 40°, and the difference (Ts−Tt) is measured.

Proportion ((Vh/Vc)·100) of total volume Vh of the thermoplastic resin composition for the two half shells 10 that are placed into the mold 6 (STP 10) to the volume Vc of the cover 3 is set to be 105% or greater and 120% or less. In other words, 5% or greater and 20% or less resin composition outflows from the spherical cavity when the cover 3 is formed. This amount of the outflow is smaller in comparison with the amount of the outflow in conventional processes for producing a golf ball. When the proportion is less than the above range, control of the amount of the outflow may involve difficulties. In this respect, the proportion is more preferably equal to or greater than 107%. When the proportion is beyond the above range, the resin composition outflows toward a specific direction in a converged manner, and thus a cover 3 having uneven thickness maybe formed. In this respect, the proportion is more preferably equal to or less than 115%.

Figure 6:
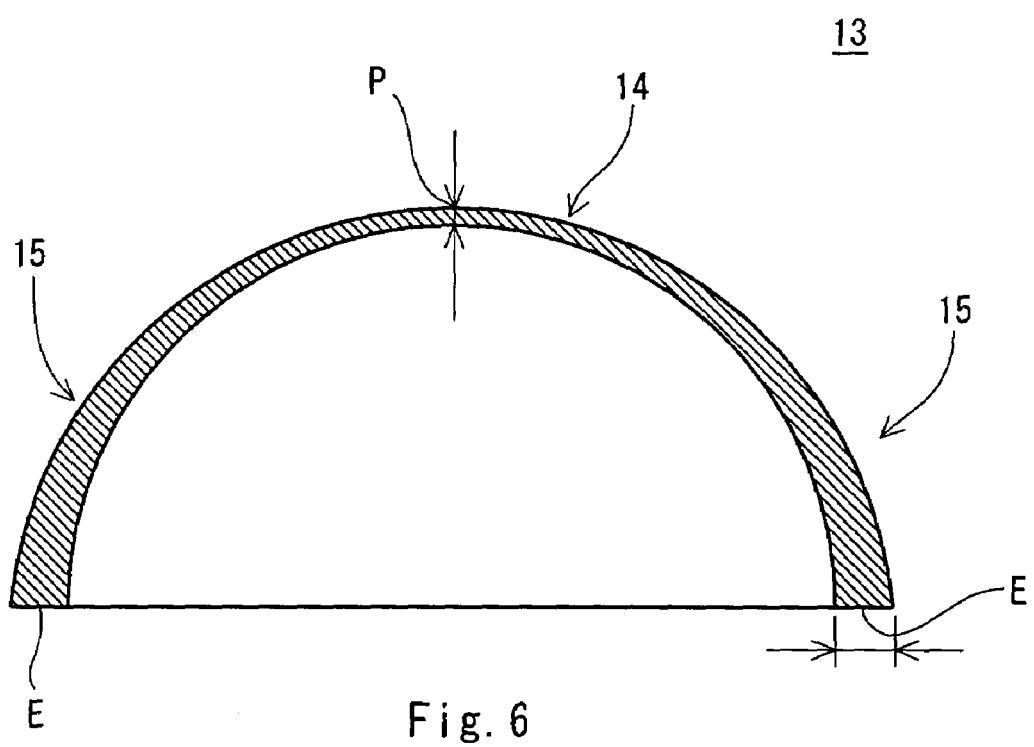
FIG. 6 is a cross sectional view illustrating another half shell for use in the process for the production according to the present invention.

FIG. 6 is a cross sectional view illustrating another half shell 13 for use in the process for the production illustrated in FIG. 3. In this half shell 13, the thickness is gradually increased from the top P to the end E. The thickness Tt of the top part 14 is measured at the top P. The thickness Ts of the side part 15 is measured at the end E. Also by using this half shell 13, a golf ball 1 which is excellent in sphericity and uniformity of the thickness of the cover thereof is obtained.

Also in this half shell 13, the difference (Ts−Tt) between the thickness Ts of the side part 15 and the thickness Tt of the top part 14 is preferably equal to or greater than 0.02 mm, more preferably equal to or greater than 0.05 mm, still more preferably equal to or greater than 0.07 mm, and particularly preferably equal to or greater than 0.10 mm. Further, the difference (Ts−Tt) is preferably equal to or less than 0.30 mm, and particularly preferably equal to or less than 0.25 mm. The difference (Tt−T) between the thickness Tt of the top part 14 and the nominal thickness T is usually −0.2 mm or greater and 0.2 mm or less. The difference (Ts−T) between the thickness Ts of the side part 15 and the nominal thickness T is usually 0.05 mm or greater and 0.40 mm or less.

Also in this half shell 13, the proportion ((Vh/Vc)·100) is set to be 105% or greater and 120% or less. The proportion is more preferably equal to or greater than 107%. The proportion is more preferably equal to or less than 115%.

The process for the production according to the present invention is suitable for a golf ball 1 having a cover 3 including a thermoplastic elastomer as a principal component. Illustrative examples of preferable thermoplastic elastomer include thermoplastic polyurethane elastomers, thermoplastic polyamide elastomers, thermoplastic polyester elastomers and thermoplastic styrene elastomers. Two or more kinds of thermoplastic elastomers may be used in combination. The process for the production according to the present invention is particularly suitable for a golf ball 1 having a cover 3 including a soft elastomer (typically, a thermoplastic polyurethane elastomer) as a principal component. Specifically, this process for the production is suitable for a golf ball 1 having a cover 3 including a thermoplastic polyurethane elastomer in an amount of equal to or greater than 50% by weight occupied in total amount of the base polymer.

Specific examples of the thermoplastic polyurethane elastomer include "Elastolan", trade name by BASF Polyurethane Elastomers Co., Ltd. Specific examples of the thermoplastic polyamide elastomer include "Pebax®", trade name by Toray Industries, Inc. Specific examples of the thermoplastic polyester elastomer include "Hytrel®", trade name by Dupont-Toray Co., Ltd. Specific examples of the thermoplastic styrene elastomer include "Rabalon®", trade name by Mitsubishi Chemical Corporation.

EXAMPLES

Example 1

A rubber composition including polybutadiene as a base rubber was subjected to crosslinking to obtain a core having the diameter of 41.1 mm. On the other hand, 80 parts by weight of a thermoplastic polyurethane elastomer ("Elastolan XNY97A", trade name by BASF Polyurethane Elastomers Co., Ltd.), 20 parts by weight of a thermoplastic polyamide elastomer ("Pebax® 5533", trade name by Toray Industries, Inc.), and 5 parts by weight of titanium dioxide were kneaded in a double axis extruder to obtain a resin composition. A half shell having the thickness Tt of the top part of 0.90 mm and the thickness Ts of the side part of 1.00 mm was obtained from this resin composition by an injection molding process. The core described above was covered by two pieces of this half shell, and placed into a mold as illustrated in FIG. 2. Accordingly, a cover was formed under a condition presented in Table 1 below. The thickness of the cover was 0.80 mm.

Examples 2 to 7 and Comparative Examples 1 to 2

In a similar manner to Example 1 except that the shape and size of the half shells and the conditions for the compression were altered as presented in Table 1 below, a cover was formed.

[Calculation of Degree of Uneven Wall Thickness]

The thickness of the cover just beneath the land of the golf ball was measured for the maximum value and the minimum value in one golf ball. Degree of uneven wall thickness of the cover was determined through dividing a value obtained through subtracting the minimum value form the maximum value, by the nominal thickness. Mean values of the degree of uneven wall thickness of 50 golf balls are presented in Table 1 below.

[Calculation of Sphericity]

The diameter Dp in a longitudinal direction (direction of the pole of the mold) of the golf ball and the diameter Ds in a transverse direction (direction of a parting line of the mold) were measured, and the sphericity was determined as a value obtained by subtracting Ds from Dp. Mean values of sphericity of 50 golf balls are presented in Table 1 below.

[Evaluation of Appearance]

Appearance of 1000 golf balls was visually observed. The incidence rate of defective was calculated through counting number of the golf balls with an existing site having residual air inside of the cover, and number of the golf balls with an existing site having bare generated. The results are shown in Table 1 and Table 2 below.

TABLE 1

Results of evaluation

|  | Example 1 | Example 2 | Example 3 | Example 4 | Example 5 | Example 6 | Example 7 | Com. Example 1 | Com. Example 2 |
|---|---|---|---|---|---|---|---|---|---|
| Core diameter (mm) | 41.1 | 41.1 | 41.1 | 41.1 | 41.1 | 41.1 | 41.1 | 41.1 | 41.1 |
| Nominal thickness T of cover (mm) | 0.80 | 0.80 | 0.80 | 0.80 | 0.80 | 0.80 | 0.80 | 0.80 | 0.80 |
| Half shell type | FIG. 6 | FIG. 6 | FIG. 6 | FIG. 6 | FIG. 5 | FIG. 6 | FIG. 6 | FIG. 6 | FIG. 6 |
| Thickness Tt of top part (mm) | 0.90 | 0.80 | 0.85 | 0.85 | 0.60 | 0.85 | 0.85 | 0.95 | 1.00 |
| Thickness Ts of side part (mm) | 1.00 | 0.90 | 0.95 | 0.90 | 0.90 | 0.95 | 0.95 | 0.85 | 0.95 |
| (Ts − Tt) (mm) | 0.05 | 0.10 | 0.10 | 0.05 | 0.30 | 0.10 | 0.10 | −0.10 | −0.05 |
| (Vh/Vc) · 100 (%) | 120 | 106 | 113 | 109 | 111 | 113 | 113 | 106 | 120 |
| Heating temperature (° C.) | 120 | 120 | 120 | 120 | 120 | 120 | 120 | 120 | 120 |
| Low pressurizing |  |  |  |  |  |  |  |  |  |
| Pressure (kgf/cm$^2$) | 30 | 30 | 30 | 30 | 30 | 75 | 5 | 30 | 30 |
| Time (min) | 3 | 3 | 3 | 3 | 3 | 3 | 3 | 3 | 3 |
| High pressurizing |  |  |  |  |  |  |  |  |  |
| Pressure (kgf/cm$^2$) | 110 | 110 | 110 | 110 | 110 | 110 | 110 | 110 | 110 |
| Time (min) | 9 | 9 | 9 | 9 | 9 | 9 | 9 | 9 | 9 |
| Degree of uneven wall thickness of cover | 0.25 | 0.06 | 0.10 | 0.08 | 0.09 | 0.19 | 0.09 | 0.06 | 0.28 |
| Sphericity (mm) | 0.01 | 0.01 | 0.01 | 0.07 | −0.08 | 0.01 | 0.01 | 0.25 | 0.20 |
| Ratio of defective appearance (%) |  |  |  |  |  |  |  |  |  |
| Residual air | 0 | 0 | 0 | 0 | 0 | 0 | 0 | 0 | 0 |
| Bare | 0 | 0 | 0 | 0 | 0 | 0 | 0 | 0 | 0 |

As is shown in Table 1, the golf balls obtained in accordance with the process for the production of Examples are excellent in sphericity. Accordingly, advantages of the present invention are clearly indicated by these results of evaluation.

The description herein above is merely for illustrative examples, and therefore, various modifications can be made without departing from the principles of the present invention.

What is claimed is:

1. A process for producing a golf ball comprising:
   a first step wherein generally hemispherical half shells are formed comprising a thermoplastic resin composition, the half shells having a central part surrounded by a side part, central part having a boundary defined by a central angle of 10°–70°, the thickness of the central part being less than the thickness of the side part;

a second step wherein a core covered by two of said half shells are placed into a mold comprising confronting portions both of which having a hemispherical cavity, in an open state of said mold;

a third step wherein said mold is clamped, bringing said confronting portions together to form a spherical cavity; and a fourth step wherein a thermoplastic resin composition is compressed while being heated in the spherical cavity formed by the clamping, resulting in outflow of excess thermoplastic resin composition from the spherical cavity that cannot be accommodated by the volume of the spherical cavity, to form a cover having the nominal thickness of 0.3 mm or greater and 1.0 mm or less with thermoplastic resin composition remaining in the spherical cavity.

2. The process for producing a golf ball according to claim 1 wherein the difference (Ts−Tt) between the thickness Ts of the side part and the thickness Tt of the central part of the half shells formed in said first step is 0.02 mm or greater and 0.30 mm or less.

3. The process for producing a golf ball according to claim 1 wherein the volume of the thermoplastic resin composition of the two half shells placed into said second step is set to be 105% or greater and 120% or less of the volume of the cover.

4. The process for producing a golf ball according to claim 1 wherein said fourth step comprises a low pressurizing step in which the thermoplastic resin composition is compressed at a pressure of 5 kgf/cm$^2$ or greater and 75 kgf/cm$^2$ or less, and a high pressurizing step in which the thermoplastic resin composition is compressed at a pressure of 100 kgf/cm$^2$ or greater and 250 kgf/cm$^2$ or less.

* * * * *